United States Patent
Gasparinl et al.

(10) Patent No.: US 7,346,775 B2
(45) Date of Patent: *Mar. 18, 2008

(54) SYSTEM AND METHOD FOR AUTHENTICATION OF USERS AND WEB SITES

(75) Inventors: Louis A Gasparinl, San Mateo, CA (US); Charles E Gotlieb, San Francisco, CA (US)

(73) Assignee: RSA Security Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/511,998

(22) Filed: Aug. 28, 2006

(65) Prior Publication Data

US 2006/0288213 A1    Dec. 21, 2006

Related U.S. Application Data

(63) Continuation of application No. 10/435,322, filed on May 9, 2003, now Pat. No. 7,100,049.

(60) Provisional application No. 60/379,295, filed on May 10, 2002.

(51) Int. Cl.
*H04L 9/00* (2006.01)
*G06F 17/30* (2006.01)
*G06F 7/04* (2006.01)
*G06F 15/173* (2006.01)

(52) U.S. Cl. ............... 713/170; 713/176; 726/10; 726/19; 709/225

(58) Field of Classification Search ............... None
See application file for complete search history.

(56) References Cited

U.S. PATENT DOCUMENTS

| | | | |
|---|---|---|---|
| 6,006,328 A | 12/1999 | Drake | |
| 6,161,139 A * | 12/2000 | Win et al. | 709/225 |
| 6,374,359 B1 * | 4/2002 | Shrader et al. | 726/5 |
| 6,401,125 B1 | 6/2002 | Makarios et al. | |
| 6,460,141 B1 | 10/2002 | Olden | |
| 6,632,248 B1 | 10/2003 | Isaac et al. | |
| 6,691,232 B1 * | 2/2004 | Wood et al. | 726/6 |
| 6,715,080 B1 * | 3/2004 | Starkovich et al. | 726/7 |
| 6,950,949 B1 * | 9/2005 | Gilchrist | 726/19 |
| 6,985,953 B1 * | 1/2006 | Sandhu et al. | 709/229 |

(Continued)

FOREIGN PATENT DOCUMENTS

EP    001128628 A1 *    8/2001

(Continued)

OTHER PUBLICATIONS

Levy, E., "Interface Illusions," Nov. 2004, Security and Privacy Magazine, IEEE, vol. 2, Issue 6, pp. 66-69.*

(Continued)

*Primary Examiner*—Syed A. Zia
*Assistant Examiner*—Kaveh Abrishamkar

(57) ABSTRACT

A system and method allows a user to authenticate a web site, a web site to authenticate a user, or both. When a user requests a web page from the web site, customization information that is recognizable to the user is provided to allow the user to authenticate the web site. A signed, encrypted cookie stored on the user's system allows the web site to authenticate the user.

22 Claims, 4 Drawing Sheets

U.S. PATENT DOCUMENTS

| | | | |
|---|---|---|---|
| 7,100,049 B2 * | 8/2006 | Gasparini et al. | 713/170 |
| 7,216,236 B2 * | 5/2007 | Kou et al. | 713/183 |
| 2001/0045451 A1 * | 11/2001 | Tan et al. | 235/375 |
| 2002/0124172 A1 | 9/2002 | Manahan | |
| 2003/0046551 A1 | 3/2003 | Brennan | |

FOREIGN PATENT DOCUMENTS

| | | |
|---|---|---|
| EP | 04760929 | 4/2007 |
| WO | 0118636 | 3/2001 |
| WO | 0163878 | 8/2001 |
| WO | WO 03/044641 A1 * | 5/2003 |

OTHER PUBLICATIONS

Guo, Fanglu, "Spoof Detection for Preventing DoS Attacks against DNS Servers," Jul. 4, 2006, Distributed Computing Systems, 2006. ICDCS 2006, 26th IEEE International Conference on Distributed Computing Systems.*

Rachna Dhamija, J.D. Tygar, The Battle Against Phishing: Dynamic Security Skins, Symposium on Usable Privacy and Security (SOUPS), Jul. 6-8, 2005, Pittsburgh, PA, USA, 12 pages.

Written Opinion of the International Searching Authority, Dec. 18, 2006, 4 pages.

International Search Report, Dec. 18, 2006, 3 pages.

Australian Office Action, Nov. 13, 2006, 2 pages.

* cited by examiner

SYSTEM AND METHOD FOR AUTHENTICATION OF USERS AND WEB SITES

RELATED APPLICATIONS

This application is a continuation of U.S. patent application Ser. No. 10/435,322, entitled "Method and Apparatus for Authentication of Users and Web Sites" filed on May 9, 2003 now U.S. Pat. No. 7,100,049, by Louis Gasparini and Charles Gotlieb, which claims the benefit of U.S. provisional patent application 60/379,295 entitled "Smart Marks" filed on May 10, 2002 by Louis Gasparini, each having the same assignee as the present application and each is hereby incorporated by reference in its entirety.

FIELD OF THE INVENTION

The present invention is related to computer security and more specifically to computer security for the World Wide Web.

BACKGROUND OF THE INVENTION

The Internet and the World Wide Web allow users to communicate with software operating at various sites on the Web. However, it may be helpful to allow one or both of these entities to ensure that the other entity with whom the entity is communicating really is that other entity.

If the web site believes it is communicating with one entity, but it is in fact communicating with a different entity, it may provide access to sensitive information of the entity with which it falsely believes it is communicating. It may cause the transfer of securities, the shipment of products or the delivery of services to the different entity in the name of the entity with which it believes it is communicating. For example, some operators of web sites lose significant amounts of money by shipping products or transferring cash or other securities to thieves who falsely identify themselves to the web site as a registered user.

Many of these thieves trick the users into providing confidential information that the thief can use to identify herself as a registered user, by appearing to the user as if a web site operated by the thief is in fact a web site with which the user has registered. For example, a thief may send out a batch of e-mails inviting the user to log on to paypal.com with a link to the web site paypai.com, hoping that the recipient of the e-mail is registered at the financial web site paypal.com. However, the thief capitalizes the last letter in her site to read paypaI.com, hoping the 'I' looks like the lower case last letter 'l' in "paypal". The web pages provided by the web site paypai.com are then made to look like the web site paypal.com, and when the user attempts to log in, the user's username and password are captured by the thief's web site. The thief then logs into paypal.com using the user's username and password thus received and authorizes the transfer of money from the user's account into an account controlled by the thief.

In another variation of the scam, the thief provides to the user a link containing what appears to be a URL of the actual site, but in fact is a command to log into the thief's site. For example, a link that reads "http://" appended to "www.paypal.com/%sdafghdgk%fdsgsdhdsh... " may appear to be a genuine link to paypal.com, with a long list of parameters that extend off the end of the URL window in the user's browser. Unknown to the user, the above link actually terminates with "...@paypai.com", which causes the user to be logged into the web site paypai.com using as a username, the set of characters to the left of the "@" sign. The web site paypai.com allows any such username to log into the web site, and then operates as described above, presenting a replica of the paypal.com user interface to the user that allows the user to log on to the application software at the thief's web site (even though the phony username has been provided via the link), which then uses the username and password thus received to log onto the real paypal.com web site and make the transfer.

To combat this problem, some web sites provide a certificate to allow the user to verify that the web site is authentic, but the procedures for performing such authentication are complex, cumbersome and unknown to most users. Thus, conventional methods that could be used to allow a user to authenticate the web site are ineffective because they are too difficult to use.

Not only can a dishonest operator of a web site mislead a user into believing that a web site is authentic, a dishonest user can mislead an authentic web site into believing that the user is authentic. As described above, confidential information from a user can be captured and then used to cause the web site to believe it is dealing with that user. Some web sites place cookies on the user's computer and these cookies could be used to attempt to verify the possibility that the person attempting to log in is in fact that person. However, a cookie can be faked by a thief to indicate that the thief's computer system is the computer system of a user the thief is attempting to impersonate.

What is needed is a system and method that can securely authenticate a user to a web site, easily authenticate the web site to the user without requiring the user to use complex authentication procedures, or both.

SUMMARY OF INVENTION

A system and method provides an encrypted, signed cookie on a user's computer system to allow the web site to identify and authenticate the user. In addition, or alternatively, customization information is associated with an identifier of the user to allow the user to recognize that the web site is authentic. When the user requests a web page, the cookie is retrieved by the web site and the signature may be checked to authenticate the user. An identifier in the cookie may be used to identify the user and allow the web site to provide the customization information the user can recognize to authenticate the web site. The user can then use a site that provides the customization information the user is expecting. If the customization information is missing or different, the user can refuse to provide confidential information to that web site, or refuse to believe information provided by the web site thus protecting his or her username and password and other confidential information from a thief.

DETAILED DESCRIPTION OF A PREFERRED EMBODIMENT

Figure 1:
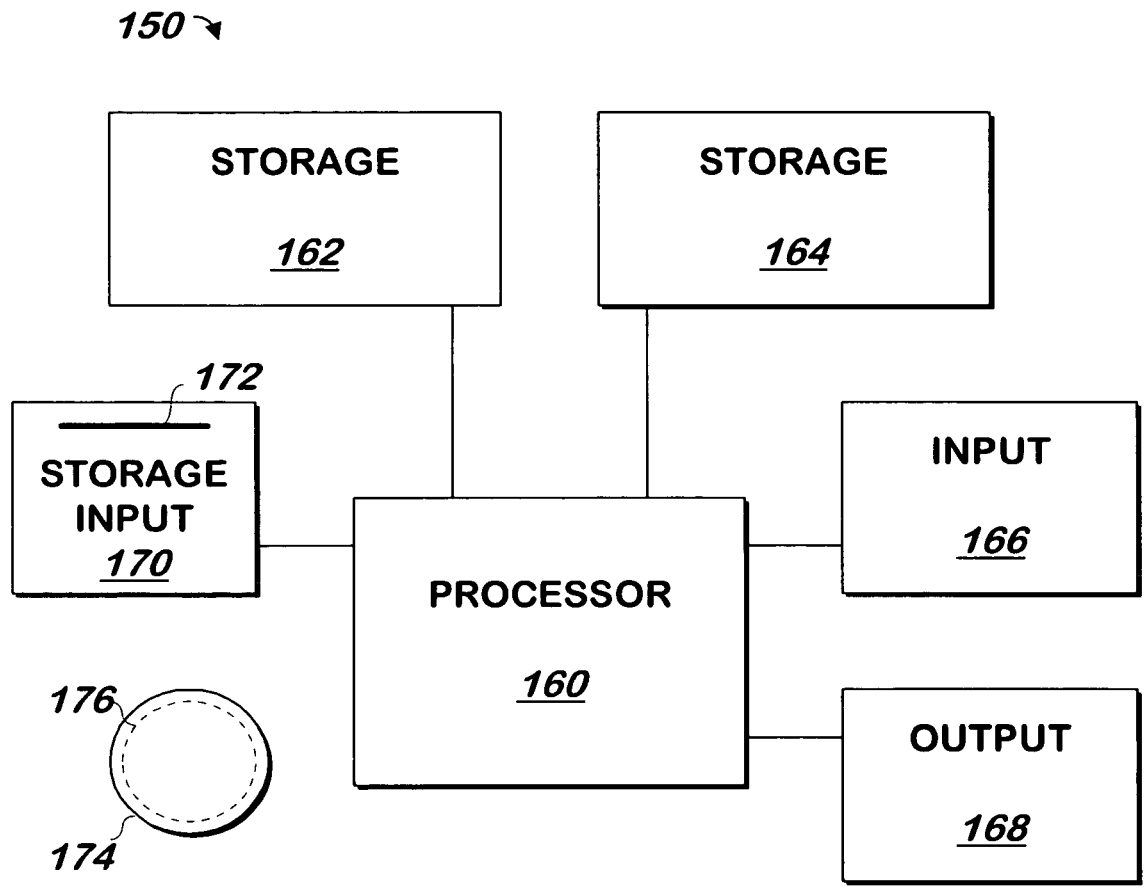
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
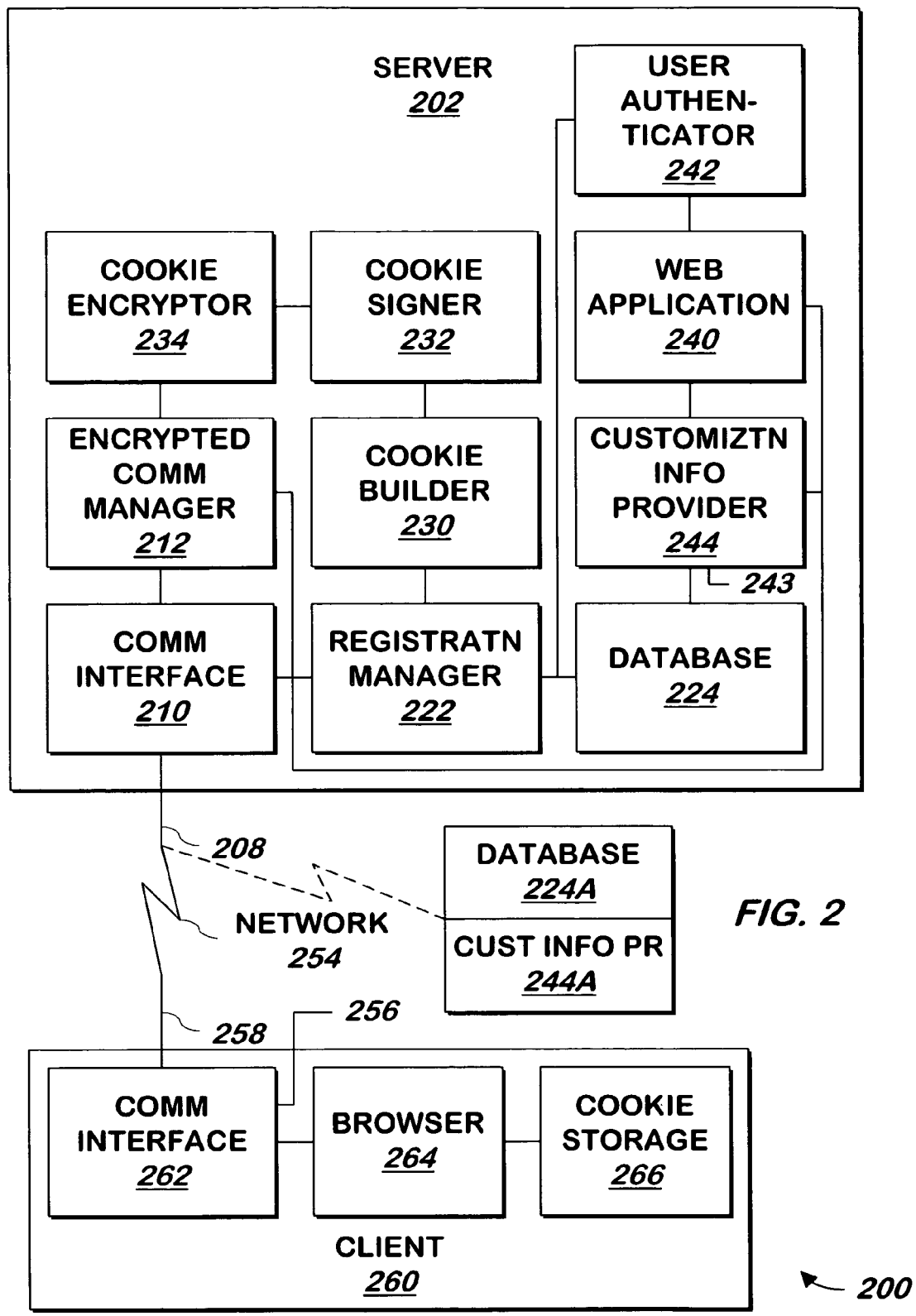
FIG. 2 is a block schematic diagram of a system for allowing a user to authenticate a web site and the web site to authenticate the user according to one embodiment of the present invention.

Referring now to FIG. 2, a system 200 for allowing a user to authenticate a web site and the web site to authenticate the user is shown according to one embodiment of the present invention. Although both of these functions are described herein, in one embodiment, one of these functions may be used without the other: it is not necessary to employ both functions according to the present invention, although other embodiments employ both functions.

System 200 includes one or more servers and one or more clients, a representative server 202 and client 260 being shown, although multiple clients may access server 202 simultaneously or at different times and multiple servers may be simultaneously used. Server 202 is shown with a superset of components, and there may be multiple servers, each with the superset of components shown or a subset of them.

In one embodiment, all communication into or out of server 202 described herein is made via input/output 208 of communication interface 210 which is coupled to a network 254 such as the Internet or a local area network or both. Communication interface 210 is a conventional communication interface that supports Ethernet, TCP/IP or other conventional communication protocols.

Communication into and out of client 260 is made via input/output 258 of communication interface 262, which includes a conventional communication interface similar or identical to communication interface 210, but may also contain conventional circuitry to couple to a conventional keyboard/monitor/mouse (not shown), or other similar conventional input/output device, via input/output 256. Communication interface 262 may be coupled to network 254 via a modem coupled to input/output 258 that is also part of communication interface 262.

In one embodiment, a registration process is performed to identify customization information for each user to allow the user to perceptively authenticate the web site as described in more detail below. Such perceptive authentication may include anything capable of detection by the user, such as the look of one or more web pages, one or more sounds provided incident thereto, smell, touch, or taste. For example, a photo of the user may appear on the initial web site log on page, and optionally on subsequent pages, to indicate to the user that the page is authentic. A certain text phrase may be used in place of, or in addition to the photo. A sound known to the user may be used in addition to, or in place of, any of these.

The registration process associates an identifier of the user with the customization information that will be provided to the user to allow the user to authenticate the web site as will now be described. In one embodiment, the user provides or selects the customization information, although in another embodiment a system administrator performs this function and then informs the user of the customization information.

In one embodiment, the user uses a conventional browser 264, communication interface 262 and network 254 to log into the server 202 via a request for a web page received via communication interface 210, which, based on the port number of the request, is provided to web application 240. Although browser 264 is used as described herein, other embodiments may employ operating system software, a servlet, or other application software.

Web application 240 redirects the user's browser to a secure sockets layer port on server 202 (or a different server similar or identical to server 202 described herein), and the user's browser 264 resends the request via a secure sockets layer connection, which communication interface 210 provides to encrypted communication manager 212. Encrypted communication manager 212 uses conventional SSL processing techniques to establish the connection, receive the request and decrypt the request, and provides the decrypted request to web application 240.

Web application 240 attempts to read a cookie that may have been stored in cookie storage 266 and, if so stored, was provided to the server 202 by browser 264 as part of the connection. In one embodiment, if the cookie does not exist (or in another embodiment, in all cases), web application 240 builds a web page (which may also allow the user to log in as described below) that includes a link to a registration page provided by registration manager 222. If the user clicks the link, the user's browser 264 will request the registration page, which may use the SSL connection described above or a different SSL connection. Communication interface 210 will receive the request and provide it to registration manager 222 via an SSL connection via encrypted communication manager 212 and registration manager 222 provides the page via communication interface 210 and encrypted communication manager 212 which uses the SSL connection.

The user may provide sufficient indicia to indicate that the user is who the user says he is. This process is enforced by registration manager 222 although it may be performed in a wide variety of ways.

In one embodiment, the web page provided by registration manager 222 requires for registration the username and/or password of a person who has verified the identity of the party, which registration manager 222 has previously stored in database 224 so that the provided username and/or password may be compared by registration manager 222 with a set of authorized usernames and passwords to determine whether the user had provided sufficient indicia of his identity. In another embodiment, registration manager 222 prompts the user for another set of one or more identifiers that have been provided to the user through out-of-band means, such as mail, fax or telephone, or via another web connection or an e-mail message and that were previously generated and provided to the user by registration manager 222.

Depending on the security needs of the web site, the user may provide such sufficient indicia of identity without such other system-provided information. This may be a user identifier and password, but may also be a mother's maiden name, or other information that had been previously collected from the user or another source and stored in database 224. A challenge and response arrangement may be used in which one or more questions are randomly selected and provided to the user by registration manager 222 and registration manager receives the responses and compares the responses to the questions (e.g. pets name) to a record in database 224 that correspond with a username (and optionally a password) that is also provided by the user to registration manager 222 via the same web page form or a different web page form that is provided by registration manager. In another embodiment, the username or username and password provided by the user to registration manager 222 via a web page form it generates in response to the request may be a sufficient indicia of identification. In still another embodiment, the user need not authenticate himself to registration manager 222 and in such embodiment, sufficient indicia of identification is the fact that the party is connected to the web site at a certain time, from a specific IP address or otherwise.

Once it receives sufficient indicia of identification from the user, registration manager 222 generates, or uses an existing, identifier for the user (which may be the same as the username or other identifier that was supplied by the user, or one that corresponds to the record in the database 224 that holds other information for the user) and stores the identifier in a record for the usr in database 224 if the identifier is not already stored in any such record that may already exist for that user.

The user provides customization information.

After the user has provided sufficient indicia of the user's identity, registration manager 222 prompts the user to select from a predefined list, or provide customization information some or all of which can be presented to the user when the user is requested to provide confidential or other information to the web site. As noted above, a system administrator can select or provide the customization information for a user in another embodiment.

Customization information may be anything that the user can use to recognize that the web site is authentic. It may be any number of any of the following: a photo, a graphic, a color, a layout, a message, a sound, a smell, or anything that may be sensed by touch. The customization information may be selected from a list or may be original information that is provided by the user who will use it to identify the authenticity of the web site, such as a digital photo of himself. The customization information need not be static: it may be a formula, such as "Today is @date", where "@date" is replaced by that day's date, or "Only (@5May—today) days until your birthday" in which the number of days until the following fifth of May is substituted for "(@5May—Today)".

Registration manager 222 provides a web page to allow the user to select or provide any number of any of the above items and then stores the items or indications of the items in the database record for the user in database 224. In still another embodiment, registration manager 222 generates or selects (i.e. randomly) such customization information and provides it to the user and stores it in the database record. The customization information may be provided via the web page or out of band as described above.

In one embodiment, registration manager 222 provides, or prompts and receives the customization information via encrypted communication manager 212 which initiates and uses a secure communication channel such as SSL-encrypted communications, to provide, or prompt and receive the customization information to prevent others from intercepting the customization information.

A cookie is encrypted, signed and stored.

Registration manager 224 also initiates the storage of a signed, encrypted cookie on the user's computer system. Such storage may be performed at any time after the user has provided the sufficient indicia of the user's identity as described above, and may be performed either before, after or in place of, the identification of customization information described above.

To build and store the cookie, registration manager 224 provides to cookie builder 230 the identifier of the user stored in the user's record in database 224 as described above. Cookie builder 230 includes the user identifier into the cookie and may add other status information to the cookie and provides the identifier and the other information to cookie signer 232, which signs the cookie using conventional cryptographic techniques, such as by hashing the identifier, and optionally the other information, using a secret hash key to produce a hash result referred to herein as the cookie signature. Cookie signer 232 provides the cookie signature, identifier and optionally, the other information, collectively referred to as the cookie, to cookie encryptor 234, which encrypts the cookie using conventional encryption techniques, such as using the public key of a public key/private key pair or using a symmetric key. Cookie encryptor 234 then causes browser 264 to store the encrypted cookie in cookie storage 266 on the user's client computer system 260 via encrypted communication manager 212, communication interface 210 network 254 communication interface 262 optionally using an SSL connection, such as the connection used for registration as described above. Cookie storage 266 may be conventional memory or disk storage and may be a portion thereof used for the storage of cookies, and may be part of the client computer system 260 or may reside in a removeable device such as a smart card, USB memory token (a portable memory device that interfaces to a personal computer through a USB port, such as the USB Memory Key commercially available from Dell Computer Systems of Round Rock, Tex.) or the like. Although a cookie is used as described herein, other embodiments may employ types of encrypted files, certificates or other similar data structures.

In one embodiment, the user's client computer system 260 need not be used for the initial registration. Instead, the registration process may be performed in two parts: the first part allows the user to select customization information as described above from a specific set of browsers with known IP addresses or authenticated using a system administrator user, identifier and password. The second part allows the user to log in using the indicia of the user's identity as described above from his own browser, at which time the encrypted cookie is placed on the user's client computer system 260.

Verifying the identity of the Web Page And/Or the User.

Subsequent to receiving the cookie as described above, when the user requests a web page from the web site, the user will use his or her web browser 264 to send the request to server 202. Browser 264 sends the request to server 202 via communication interfaces 262 and 210 and network 254. Communication interface 210 passes the request to web application 240, which is a conventional web application program modified as described herein. Web application 240 may authenticate the user, provide customization information to allow the user to authenticate the web site, or both, as will now be described.

To authenticate the user, web application 240 reads the encrypted cookie provided by browser 264 from cookie storage 266, such cookie being placed in cookie storage 266 as described herein. Web application 240 passes the encrypted cookie to user authenticator 242, which decrypts the encrypted cookie, and then separates the signature from the remainder of the cookie. User authenticator 242 verifies that the signature corresponds to the remainder of the cookie (e.g. by rehashing the remainder of the cookie using the same hash algorithm and hash key as was used to build the signature, and comparing the hash result to the signature) and either provides web application 240 with the user's identifier and other information that may be stored in cookie if user authenticator 242 authenticates the user via the signature (e.g. the hash result it generates matches the signature), or indicates that the cookie is not valid (e.g. if the hash result user authenticator 242 generates does not match the signature).

If user authenticator 242 indicates the cookie is not valid, web application 240 may deny access to some or all of the web site. Otherwise, web application 240 receives the user identifier and uses the user identifier to operate web application 240 and/or provide customization information, selected as described herein, to the user.

Customization information may be provided with every web page provided by web application 240, some web pages, with web pages that are displayed to provide confidential information to the user, with web pages used to request any information from the user, or with web pages that are used to request confidential information from the user or any combination of some or all of these. Confidential information may include information that can be used to gain access to financial or other resources of the operator of the web site or the user, or other information that a user may not wish others to know.

Customization information may be provided as part of web pages described above, or it may be provided separately. To provide customization information with any of the web pages described above, web application 240 provides to customization information provider 244 the user identifier received as described above and the contents of a web page that has the customization information omitted, optionally with one or more indications in the web page that describe how and where to insert the customization information into the web page, along with the user's IP address and other information that can be used to address the web page.

Customization information provider 244 retrieves from database 224 the customization information stored in the record corresponding to the user identifier, and provides the customization information, for example by adding it to the web page it receives from web application 240 in accordance with instructions received with, or as part of the web page or by providing it at a certain place in the web page, and provides to the user the customization information with any web page it receives using the user's IP address it receives.

In one embodiment, the customization information may be provided by customization information provider 244 out of band, such as by calling the user's mobile telephone and instructing the user that the web page is authentic by playing a recording of the user's voice, a favorite song, a prerecorded message or otherwise. The out of band customization information can be provided via output 243, which may be coupled to a conventional telephone line, with customization information provider 244 containing a suitable interface.

When the user receives the customization information such as via browser 264 and a monitor coupled to input/output 256 or out of band, the user may use it to authenticate the web site, and withhold providing information or using the web site if the customization is missing or different from the customization information the user selected or provided as described above. If the customization information is what was registered as described herein, the user may provide confidential information via web pages provided by web application 240, believe information received therefrom, or both.

Although customization information is described herein as having a single instance for each user, multiple, different instances of customization information may be registered for each of some or all of the users, with each instance of customization information having a different meaning, e.g. one instance may mean that it is OK for the user to provide secure information, and a different instance of customization information for the same user to mean that information on the page has been validated as having been provided from an authentic source. Association of each instance of the customization information with the identifier of the user can be performed as described herein, along with an identifier of the instance, and each instance of customization information for a user may be perceptively different from the other instances for that user. Web application 240 then provides to customization information provider 244 the identifier of the user and an identifier of the instance of customization information that should be provided, and customization information provider 244 uses the identifier of the user and the identifier of the instance to retrieve and provide to the user the proper instance of customization information in the same manner as was described above for the single instance of customization information for each user.

Database May be Centralized

In one embodiment, database 224 does not reside in server 202 but instead is replaced by database 224A that is accessible to more than one server 202 via network 254 and otherwise operates as database 224. Each such more than one server may serve the same web site as server 202 or a different web site. In such embodiment, there is more than one server 202 and either each server registers users and provides customization information as described above, but shares the central database 224A in place of database 224, or only a fraction of the servers 202 register users, with other servers making use of the customization information the users identify or provide to such registering server or that is provided by such registering server as described above.

In one embodiment, each server 202 uses a number that is unique among the various servers for the same user, such as a web site number or server number appended to a user identifier, such as a social security number of the user, to access a user's record in database 224A. In such embodiment, customization information provider 244A that is accessible to multiple servers 202 may be used in place of customization information provider 244 so that the servers 202 do not have access to the customization information of the user. Customization information provider 244A operates in the same manner as customization information provider 244 to send to the user the customization information with the web page.

In one embodiment, either database 224A or customization information provider 244A, and web application 240 or customization information provider 244, use conventional authentication techniques to authenticate requests for customization information or requests to send a web page with customization information. Such authentication techniques may include passwords, digital certificates or other conventional techniques. Such requests may be sent via encrypted communication manager 212 so that conventional SSL connections may be used to enhance security.

Figure 3A:
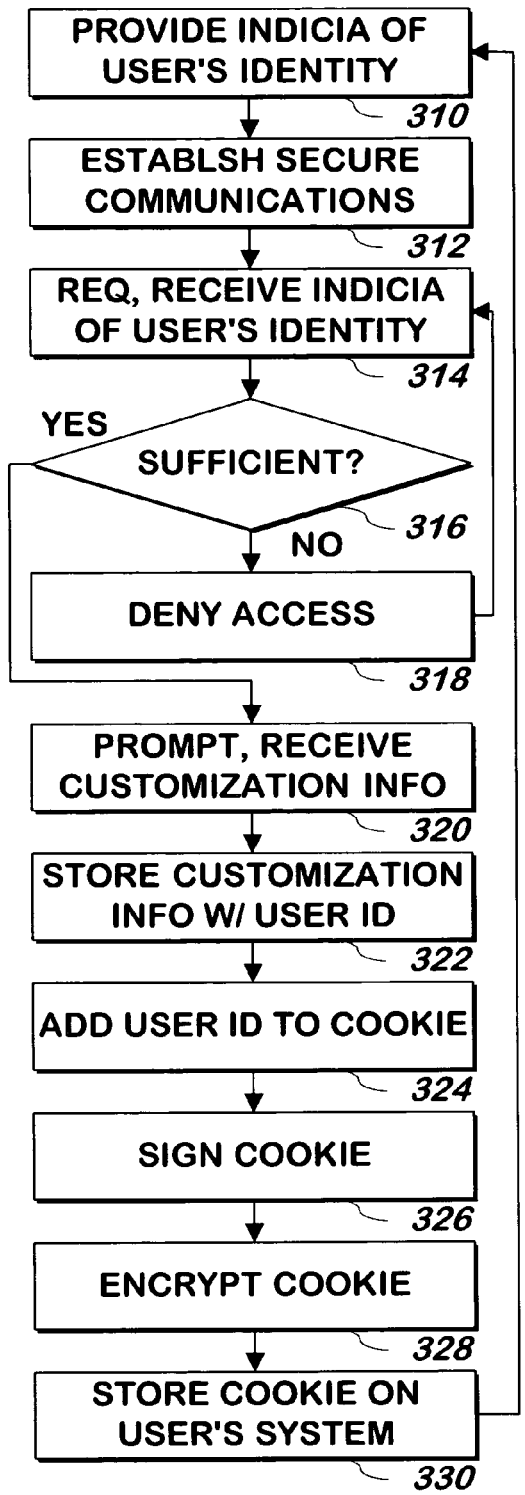
FIG. 3A is a flowchart illustrating a method of registering a user to allow the user to authenticate a web site and the web site to authenticate the user according to one embodiment of the present invention.

Referring now to FIG. 3A, a flowchart illustrating a method of registering a user to allow the user to authenticate a web site, the web site to authenticate the user, or both, is shown according to one embodiment of the present invention.

An indicia of a users identity may be generated and provided 310 as described above. The indicia provided in step 310 may be provided via the Internet or out of band (e.g. not via the Internet) as described above in one embodiment, and in another embodiment, step 310 may be omitted. Secure communications are optionally established 312 with the user. Sufficient indicia of the user's identify are requested and an indicia of the user's identity is received 314. If the indicia is not sufficient 316, access to some or all of the remainder of the steps of FIG. 3A is denied 318 and the method continues at step 314, and otherwise 316, the method continues at step 320.

At step 320, the user is prompted to select or provide customization information as described above and the customization information is received. Step 320 may be performed via a secure communication channel, such as the SSL-encrypted Internet connection established in step 312. Customization information may include user-provided content or an indication of one or more pieces of server-supplied content that will be associated with an identifier of the user. Customization information is stored 322 with an identifier of the user, which may be supplied by the user, looked up from the indicia received in step 314 or generated as part of step 322.

A cookie is built 324 using the user identifier as described above and the cookie is signed 326, encrypted 328 and stored on the user's system 330 and the method continues at step 310.

Figure 3B:
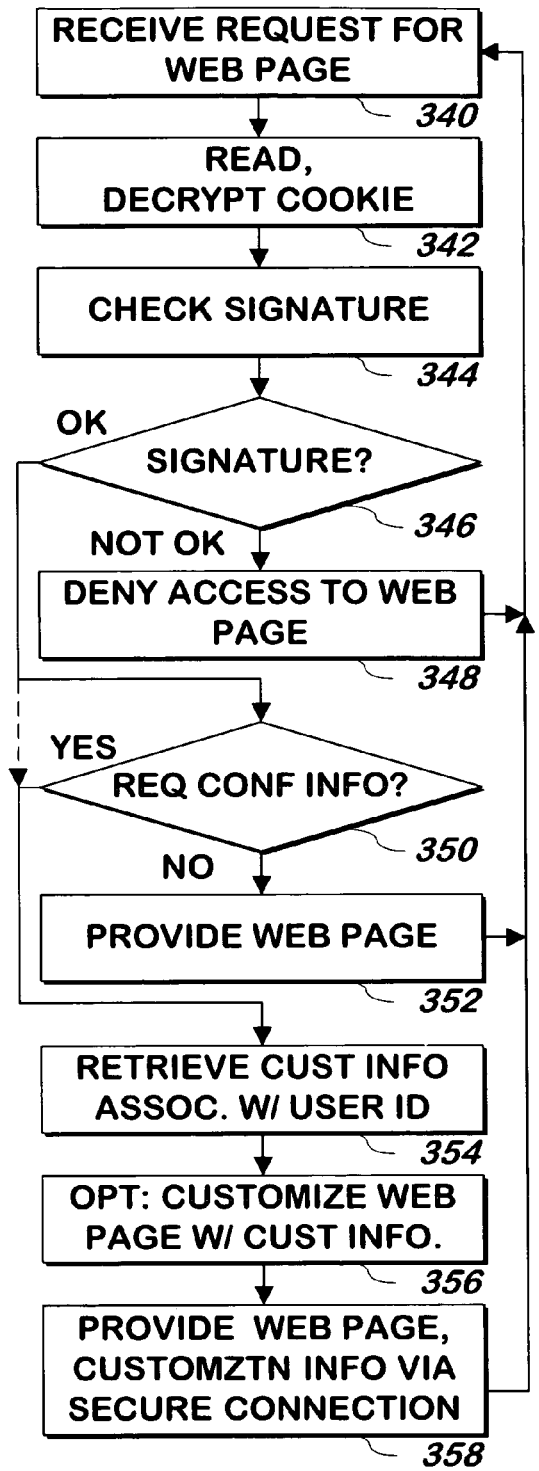
FIG. 3B is a flowchart illustrating a method of allowing a web site to authenticate a user and/or allowing the user to authenticate the web site according to one embodiment of the present invention.

Referring now to FIG. 3B, a flowchart illustrating a method of allowing a web site to authenticate a user and/or allowing the user to authenticate the web site is shown according to one embodiment of the present invention. The steps of FIG. 3B may be performed after some or all of the steps of FIG. 3A. A request for a web page is received 340 and an encrypted cookie is read 342 from the device from which the request was received and the cookie is decrypted. A signature in the decrypted cookie is checked 344 as described above, and if the signature on the cookie indicates that the cookie is not authentic 346, access to the requested web page may be denied 348 and the method continues at step 340, and otherwise 346, the method continues at step 350.

At step 350, if the request is a request for a web page that will not request confidential information or provide information that the user may want an indicia of authentication, the requested web page may be provided 352 and the method continues at step 340, and otherwise 350, the method continues at step 354. In another embodiment indicated by the dashed line in the Figure, the test of step 350 is not performed and step 354 follows the "OK" branch of step 350 unconditionally.

At step 354, a user identifier stored in the cookie retrieved in step 342 is used to retrieve customization information associated with that user identifier as described above and the customization information may be optionally incorporated into the requested web page 356 and the web page and customization information are provided, either via a secure connection, if the customization information is provided over the same connection as the web page, or the customization information may be provided out of band as described above 358.

Figure 4:
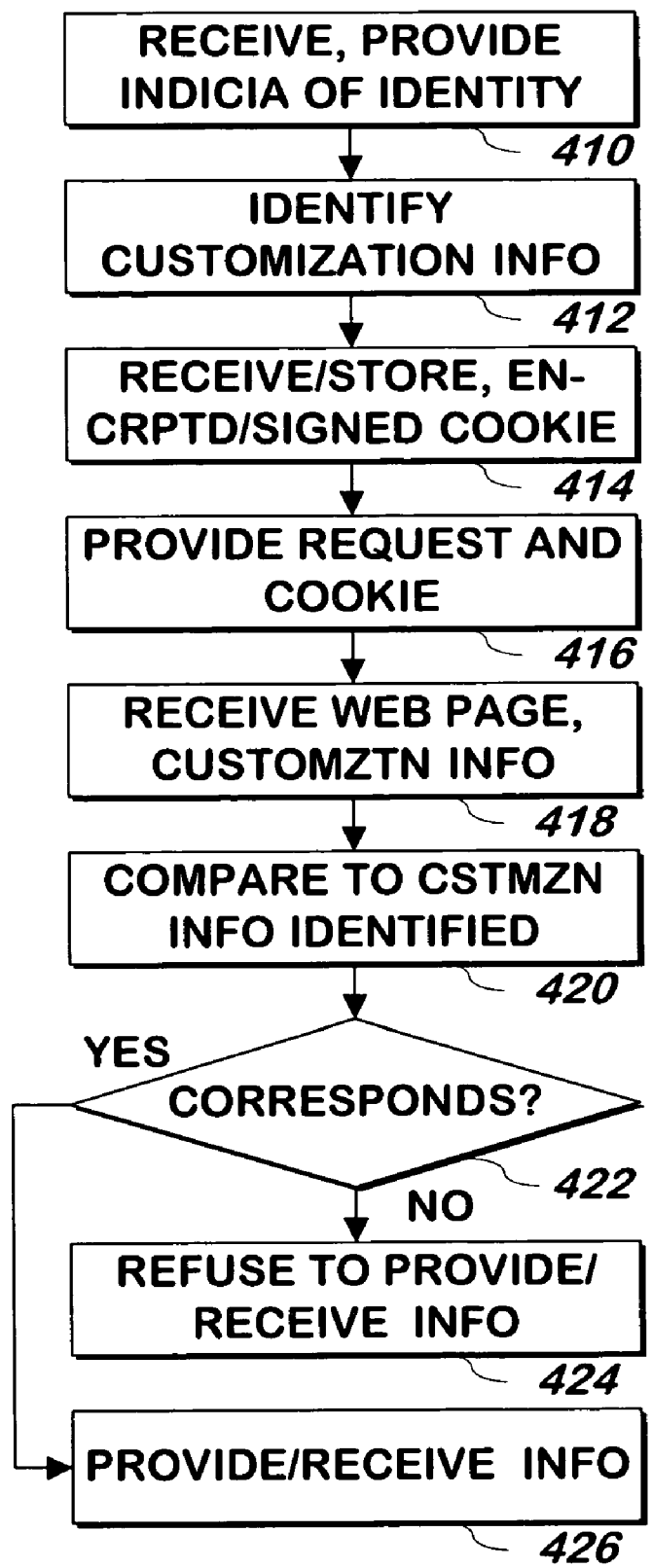
FIG. 4 is a flowchart illustrating a method of authenticating some or all of a web site by a user according to one embodiment of the present invention.

Referring now to FIG. 4, a method of authenticating some or all of a web site by a user is shown according to one embodiment of the present invention. Sufficient indicia of identity is optionally received (e.g. out of band) and provided as described above 410. Customization information is identified, such as providing it, selecting it or receiving it as described above 412. An encrypted, signed cookie may be received and stored as described above 414. A request for a web page is provided, and optionally, the encrypted, signed cookie is provided 416. The web page and optionally, certain customization information, is received 418 and the customization information is compared 420 to what was provided or selected in step 412. If the customization information received corresponds 422 to that which was identified in step 412 (e.g. because it matches), information may be received and believed or provided 426 and otherwise, the user may refuse to receive or believe the information received or refuse to provide information requested 426.

What is claimed is:

1. A method of providing a web page to a device for authentication by a user, the method comprising the steps of:
    responsive to a request for the web page, determining whether an encrypted cookie comprising a user identifier is stored on the device;
    responsive to a determination that an encrypted cookie comprising a user identifier is not stored on the device, performing steps comprising:
        requesting the user to provide indicia of the user's identity;
        determining a user identifier based at least in part on the indicia;
        determining whether the user identifier is associated with customization information;

responsive to a determination that the user identifier is not associated with customization information, performing steps comprising:
    requesting the user to identify customization information by at least one selected from:
        allowing the user to provide the customization information;
        allowing the user to select the customization information from a set comprising the customization information and other information; and
        providing the customization information to the user;
    associating with the user identifier the customization information identified;
    providing the user identifier in a cookie;
    encrypting the cookie; and
    storing the cookie on the device;
responsive to a determination that the user identifier is associated with customization information, performing steps comprising:
    providing the customization information, via at least one selected from:
        a secure connection; and
        a communication channel different from that used to provide the web page;
    such that the user may authenticate the web page based at least in part on the customization information;
    providing the user identifier in a cookie;
    encrypting the cookie; and
    storing the cookie on the device;
responsive to a determination that an encrypted cookie comprising a user identifier is stored on the device, performing steps comprising:
    reading the cookie stored;
    providing the web page requested; and
    responsive to the cookie read, providing the customization information associated with the user identifier stored in the cookie, via at least one selected from:
        a secure connection; and
        a communication channel different from that used to provide the web page;
    such that the user may authenticate the web page based at least in part on the customization information.

2. The method of claim 1 additionally comprising:
    adding a signature of the cookie to the cookie prior to the storing step; and
    verifying the signature of the cookie read.

3. The method of claim 1 wherein the customization information is provided as part of the web page.

4. The method of claim 1 wherein the customization information is provided substantially concurrently with the web page but separately therefrom.

5. The method of claim 1, wherein the providing the customization information step comprises providing to a database over a network, the user identifier from the cookie read.

6. The method of claim 1:
    additionally comprising the step of receiving an indicia of an authentication of the user; and
    wherein, the associating step is responsive to the receiving the indicia step.

7. The method of claim 6 wherein the indicia comprises a system administrator password.

8. A method of authenticating at least a portion of a web site accessed by a user through a device, comprising:
    electronically providing to a web server comprising the web site a request for at least one web page;
    responsive to a determination that the device does not have an encrypted cookie comprising a user identifier associated with customization information, electronically receiving an encrypted cookie comprising a user identifier, the user identifier having been associated with customization information, the customization information having been identified by at least one selected from:
        allowing the user to provide the customization information;
        allowing the user to select the customization information from a set comprising the customization information and other information; and
        providing the customization information to the user;
    responsive to a determination that the device does have an encrypted cookie comprising a user identifier associated with customization information, electronically providing to the web server the encrypted cookie;
    electronically receiving the at least one web page and the customization information; and
    authenticating the at least the portion of the web site responsive to the customization information received.

9. The method of claim 8 wherein the customization information is received as part of the web page; and
    the web page and customization information are provided via a secure connection.

10. The method of claim 8 wherein the customization information is identified via a secure connection.

11. The method of claim 10 wherein the customization information is provided to a database operated by a party other than the party operating the web site.

12. The method of claim 8 wherein the web page received comprises a form for entering confidential information.

13. A computer program product comprising a computer useable medium having computer readable program code embodied therein for providing a web page to a device for authentication by a user, the computer program product comprising computer readable program code devices configured to cause a computer to perform operations comprising:
    responsive to a request for the web page, determining whether an encrypted cookie comprising a user identifier is stored on the device;
    responsive to a determination that an encrypted cookie comprising a user identifier is not stored on the device, performing operations comprising:
        requesting the user to provide indicia of the user's identity;
        determining a user identifier based at least in part on the indicia;
        determining whether the user identifier is associated with customization information;
        responsive to a determination that the user identifier is not associated with customization information, performing operations comprising:
            requesting the user to identify customization information by at least one selected from:
                allowing the user to provide the customization information;
                allowing the user to select the customization information from a set comprising the customization information and other information; and providing the customization information to the user;
associating with the user identifier the customization information identified;
providing the user identifier in a cookie;
encrypting the cookie; and
storing the cookie on the device;
responsive to a determination that the user identifier is associated with customization information, performing operations comprising:
providing the customization information, via at least one selected from:
a secure connection; and
a communication channel different from that used to provide the web page;
such that the user may authenticate the web page based at least in part on the customization information;
providing the user identifier in a cookie;
encrypting the cookie; and
storing the cookie on the device;
responsive to a determination that an encrypted cookie comprising a user identifier is stored on the device, performing operations comprising:
reading the cookie stored;
providing the web page requested; and
responsive to the cookie read, providing the customization information associated with the user identifier stored in the cookie, via at least one selected from:
a secure connection; and
a communication channel different from that used to provide the web page;
such that the user may authenticate the web page based at least in part on the customization information.

14. The computer program product of claim 13 additionally comprising computer readable program code devices configured to cause the computer to: add a signature of the cookie to the cookie prior to the storing step; and verify the signature of the cookie read.

15. The computer program product of claim 13 wherein the customization information is provided as part of the web page.

16. The computer program product of claim 13 wherein the customization information is provided substantially concurrently with the web page but separately therefrom.

17. The computer program product of claim 13, wherein the computer readable program code devices configured to cause the computer to provide the customization information step comprise computer readable program code devices configured to cause the computer to provide to a database over a network, the user identifier from the cookie read.

18. An apparatus comprising:
a memory;
a processor coupled thereto, wherein the processor is operative to provide a web page to a device for authentication by a user, by performing operations comprising:
responsive to a request for the web page, determining whether an encrypted cookie comprising a user identifier is stored on the device;
responsive to a determination that an encrypted cookie comprising a user identifier is not stored on the device, performing operations comprising:
requesting the user to provide indicia of the user's identity;
determining a user identifier based at least in part on the indicia;
determining whether the user identifier is associated with customization information;
responsive to a determination that the user identifier is not associated with customization information, performing operations comprising:
requesting the user to identify customization information by at least one selected from:
allowing the user to provide the customization information;
allowing the user to select the customization information from a set comprising the customization information and other information; and
providing the customization information to the user; and
associating with the user identifier the customization information identified;
providing the user identifier in a cookie;
encrypting the cookie;
storing the cookie on the device;
responsive to a determination that the user identifier is associated with customization information, performing operations comprising:
providing the customization information, via at least one selected from:
a secure connection and;
a communication channel different from that used to provide the web page;
such that the user may authenticate the web page based at least in part on the customization information;
providing the user identifier in a cookie;
encrypting the cookie; and
storing the cookie on the device;
responsive to a determination that an encrypted cookie comprising a user identifier is stored on the device, performing operations comprising:
reading the cookie stored;
providing the web page requested;
responsive to the cookie read, providing the customization information associated with the user identifier stored in the cookie, via at least one selected from:
a secure connection and;
a communication channel different from that used to provide the web page;
such that the user may authenticate the web page based at least in part on the customization information.

19. The apparatus of claim 18 wherein the processor is further operative to add a signature of the cookie to the cookie prior to the storing step; and verify the signature of the cookie read.

20. The apparatus of claim 18 wherein the customization information is provided as part of the web page.

21. The apparatus of claim 18 wherein the customization information is provided substantially concurrently with the web page but separately therefrom.

22. The apparatus of claim 18 wherein the processor is further operative to provide to a database over a network, the user identifier from the cookie read.

* * * * *

UNITED STATES PATENT AND TRADEMARK OFFICE
CERTIFICATE OF CORRECTION

PATENT NO. : 7,346,775 B2 Page 1 of 1
APPLICATION NO. : 11/511998
DATED : March 18, 2008
INVENTOR(S) : L.A. Gasparini et al.

It is certified that error appears in the above-identified patent and that said Letters Patent is hereby corrected as shown below:

Title Page, Item (12):

Please delete "Gasparinl et al." and insert --Gasparini et al.--.

Title Page, Item (75) Inventor:

Please delete "Gasparinl" and insert --Gasparini--.

Signed and Sealed this

Thirtieth Day of September, 2008

JON W. DUDAS
*Director of the United States Patent and Trademark Office*